United States Patent
Shuto et al.

(10) Patent No.: US 12,141,546 B2
(45) Date of Patent: Nov. 12, 2024

(54) PRODUCT-SUM CALCULATION DEVICE AND PRODUCT-SUM CALCULATION METHOD

(71) Applicants: SONY SEMICONDUCTOR SOLUTIONS CORPORATION, Kanagawa (JP); SONY GROUP CORPORATION, Tokyo (JP)

(72) Inventors: Yusuke Shuto, Kanagawa (JP); Fumitaka Sugaya, Kanagawa (JP); Toshiyuki Kabayashi, Tokyo (JP)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 721 days.

(21) Appl. No.: 17/040,726

(22) PCT Filed: Mar. 11, 2019

(86) PCT No.: PCT/JP2019/009565
§ 371 (c)(1),
(2) Date: Sep. 23, 2020

(87) PCT Pub. No.: WO2019/188160
PCT Pub. Date: Oct. 3, 2019

(65) Prior Publication Data
US 2021/0011687 A1      Jan. 14, 2021

(30) Foreign Application Priority Data
Mar. 30, 2018    (JP) .................................. 2018-068875

(51) Int. Cl.
*G06F 7/544*    (2006.01)
*G06N 3/063*    (2023.01)

(52) U.S. Cl.
CPC ........... *G06F 7/5443* (2013.01); *G06N 3/063* (2013.01)

(58) Field of Classification Search
CPC .................................................. G06F 7/5443
See application file for complete search history.

(56) References Cited

U.S. PATENT DOCUMENTS

| | | | | |
|---|---|---|---|---|
| 5,345,422 A | * | 9/1994 | Redwine | ............... G11C 5/143 327/143 |
| 5,818,081 A | | 10/1998 | Ohmi et al. | |
| 2017/0301376 A1 | | 10/2017 | Kurokawa | |

FOREIGN PATENT DOCUMENTS

| | | |
|---|---|---|
| EP | 0739040 A1 | 10/1996 |
| JP | 06-131487 A | 5/1994 |

(Continued)

OTHER PUBLICATIONS

International Search Report and Written Opinion of PCT Application No. PCT/JP2019/009565, issued on Jun. 11, 2019, 06 pages of ISRWO.

*Primary Examiner* — Michael D. Yaary
(74) *Attorney, Agent, or Firm* — CHIP LAW GROUP

(57) ABSTRACT

To provide a product-sum calculation device that includes a plurality of synapses including a transistor and having a variable resistance value, a plurality of input lines extending in a first direction and that propagates an input signal to each of the plurality of synapses, a plurality of output lines extending in a second direction orthogonal to the first direction, and that outputs a product-sum calculation result of the input signal from each of the plurality of synapses, and a charge and discharge control unit that controls an output state of the product-sum calculation result by controlling a charge and discharge state of the output line on the basis of a polarity of the transistor.

14 Claims, 11 Drawing Sheets

(56) References Cited

FOREIGN PATENT DOCUMENTS

| | | | |
|---|---|---|---|
| JP | 07-153924 A | 6/1995 | |
| JP | 2017-194963 A | 10/2017 | |
| WO | WO-9212498 A1 * | 7/1992 | ............... G06F 7/49 |
| WO | 95/015580 A1 | 6/1995 | |
| WO | 2017/178947 A1 | 10/2017 | |

* cited by examiner

PRODUCT-SUM CALCULATION DEVICE AND PRODUCT-SUM CALCULATION METHOD

CROSS REFERENCE TO RELATED APPLICATIONS

This application is a U.S. National Phase of International Patent Application No. PCT/JP2019/009565 filed on Mar. 11, 2019, which claims priority benefit of Japanese Patent Application No. JP 2018-068875 filed in the Japan Patent Office on Mar. 30, 2018. Each of the above-referenced applications is hereby incorporated herein by reference in its entirety.

TECHNICAL FIELD

The present disclosure relates to a product-sum calculation device and a product-sum calculation method.

BACKGROUND ART

In recent years, a neural network (also called an artificial neural network), which is one of machine learning, is attracting attention. A neural network is an information processing system with a neuronal network of a living body as a model, and can efficiently perform calculation such as image recognition that has a heavy load on a digital computer.

Such a neural network can be implemented as an electric circuit applied with Ohm's law and Kirchhoff's current law, by making resistors correspond to synapses, which are the connections between neurons.

For example, Patent Document 1 described below discloses a product-sum calculation circuit having a crossbar structure in which a floating gate transistor with three terminals is used as a synapse.

CITATION LIST

Patent Document

Patent Document 1: Japanese Patent Application Laid-Open No. H6-131487

SUMMARY OF THE INVENTION

Problems to be Solved by the Invention

However, in Patent Document 1 described above, sufficient consideration has not been given to specific control for operating the product-sum calculation device. Therefore, knowledge regarding control for more efficient operation of the product-sum calculation device has been demanded.

Therefore, the present disclosure proposes a new and improved product-sum calculation device and product-sum calculation method that enable more efficient operation.

Solutions to Problems

According to the present disclosure, there is provided a product-sum calculation device including: a plurality of synapses including a transistor and having a variable resistance value; a plurality of input lines extending in a first direction and configured to propagate an input signal to each of the plurality of synapses; a plurality of output lines extending in a second direction orthogonal to the first direction, and configured to output a product-sum calculation result of the input signal from each of the plurality of synapses; and a charge and discharge control unit configured to control an output state of the product-sum calculation result by controlling a charge and discharge state of the output line on the basis of a polarity of the transistor.

Furthermore, according to the present disclosure, there is provided a product-sum calculation method including: charging or discharging an output line of a plurality of synapses including a transistor and having a variable resistance value, on the basis of a polarity of the transistor; and causing a product-sum calculation result to be output by controlling to discharge from the charged output line, or by controlling to charge the discharged output line on the basis of the product-sum calculation result of an input signal input to the plurality of synapses.

According to the present disclosure, it is possible to output a potential change more efficiently from a synapse to an output line, by controlling a charge and discharge state of the output line in accordance with a polarity of a transistor included in the synapse. Furthermore, according to the present disclosure, it is possible to further stabilize a change in a potential output from the synapse to the output line.

Effects of the Invention

As described above, according to the present disclosure, it is possible to operate the product-sum calculation device more efficiently.

Note that the effect described above is not necessarily limited, and in addition to the effect described above or instead of the effect described above, any of the effects described in this specification, or other effects that may be understood from the present specification may be exhibited.

MODE FOR CARRYING OUT THE INVENTION

Figure 1:
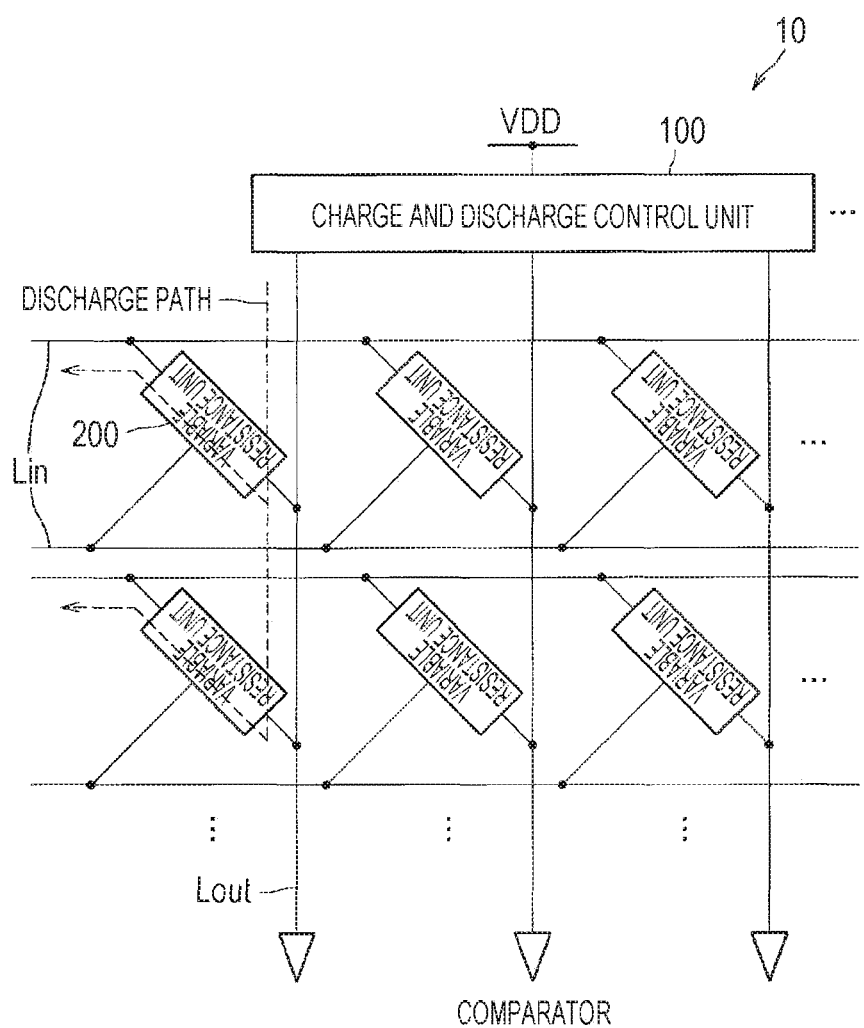
FIG. 1 is a circuit diagram schematically showing a circuit configuration of a product-sum calculation device according to a first embodiment of the present disclosure.

Hereinafter, preferred embodiments of the present disclosure will be described in detail with reference to the accompanying drawings. Note that, in the present specification and the drawings, components having substantially the same functional configuration are denoted by the same reference numerals, and redundant explanations are omitted.

Note that the description will be made in the following order.
1. First Embodiment
2. Second Embodiment
3. Third Embodiment 1. First Embodiment First, with reference to FIGS. 1, 2, 3, 4, 5A, and 5B, a product-sum calculation device according to a first embodiment of the present disclosure will be described. FIG. 1 is a circuit diagram schematically showing a circuit configuration of the product-sum calculation device according to the first embodiment of the present disclosure.

As shown in FIG. 1, a product-sum calculation device 10 according to the present embodiment includes: a plurality of input lines Lin extending in a first direction (for example, a row direction); a plurality of output lines Lout extending in a second direction (for example, a column direction) orthogonal to the first direction; a three-terminal variable resistance unit 200 provided at an intersection of the input line Lin and the output line Lout; and a charge and discharge control unit 100 configured to control charge and discharge of the output line Lout.

The product-sum calculation device 10 according to the present embodiment is an electric circuit that implements a neural network that imitates a neuronal network, as an analog circuit. Specifically, the product-sum calculation device 10 is a product-sum calculation device having a crossbar structure that uses a resistance value of the variable resistance unit 200 as a weight of a synapse.

The variable resistance unit 200 is a circuit unit including a three-terminal transistor and being capable of changing a resistance value to two or more values. The variable resistance unit 200 functions as a synapse of the product-sum calculation device 10 by controlling the resistance value with the three-terminal transistor. The variable resistance unit 200 may be configured by a single three-terminal transistor, or may be configured by a plurality of elements including a three-terminal transistor.

The variable resistance unit 200 may be, for example, a non-volatile variable resistance element of a transistor type, such as a ferroelectric transistor, a floating-gate type transistor, a spin transistor, or a spin field effect transistor.

Alternatively, the variable resistance unit 200 may be made by connecting a field effect transistor in series with a two-terminal non-volatile variable resistance element such as a magnetic tunnel junction element, a phase change memory element, a resistance change memory element, a ferroelectric tunnel junction element, a memory element using a nanotube, or a nanomechanical memory element.

In the product-sum calculation device 10 according to the first embodiment, a polarity of the three-terminal transistor included in the variable resistance unit 200 is n-type. The n-type three-terminal transistor is a transistor that uses electrons as carriers that contribute to a current between a source and a drain. The n-type three-terminal transistor may be configured, for example, by providing a gate electrode on a p-type semiconductor substrate via a gate insulating film, and providing an n-type source region and a drain region on both sides of the gate electrode.

The input line Lin inputs an input signal to a synapse of the product-sum calculation device 10. Specifically, a plurality of input lines Lin is provided extending in the row direction, and is electrically connected to a gate or a source of the three-terminal transistor included in the variable resistance unit 200. Note that the input line Lin may input the input signal to the gate of the three-terminal transistor, or may input the input signal to the source of the three-terminal transistor.

The output line Lout outputs an output from the synapse of the product-sum calculation device 10 to a comparator or the like. Specifically, a plurality of output lines Lout is provided extending in the column direction orthogonal to the row direction that is the extending direction of the input line Lin, and outputs the output from the variable resistance unit 200 to the comparator or the like. For example, the output line Lout may be electrically connected to the drain of the three-terminal transistor included in the variable resistance unit 200.

The charge and discharge control unit 100 controls a charge and discharge state of the output line Lout. Specifically, the charge and discharge control unit 100 is supplied with a power supply potential VDD, and charges in advance the output line Lout before product-sum calculation by the product-sum calculation device 10. Therefore, the charge and discharge control unit 100 can represent the output from the variable resistance unit 200 that is a synapse, as discharge of the output line Lout.

Figure 2:
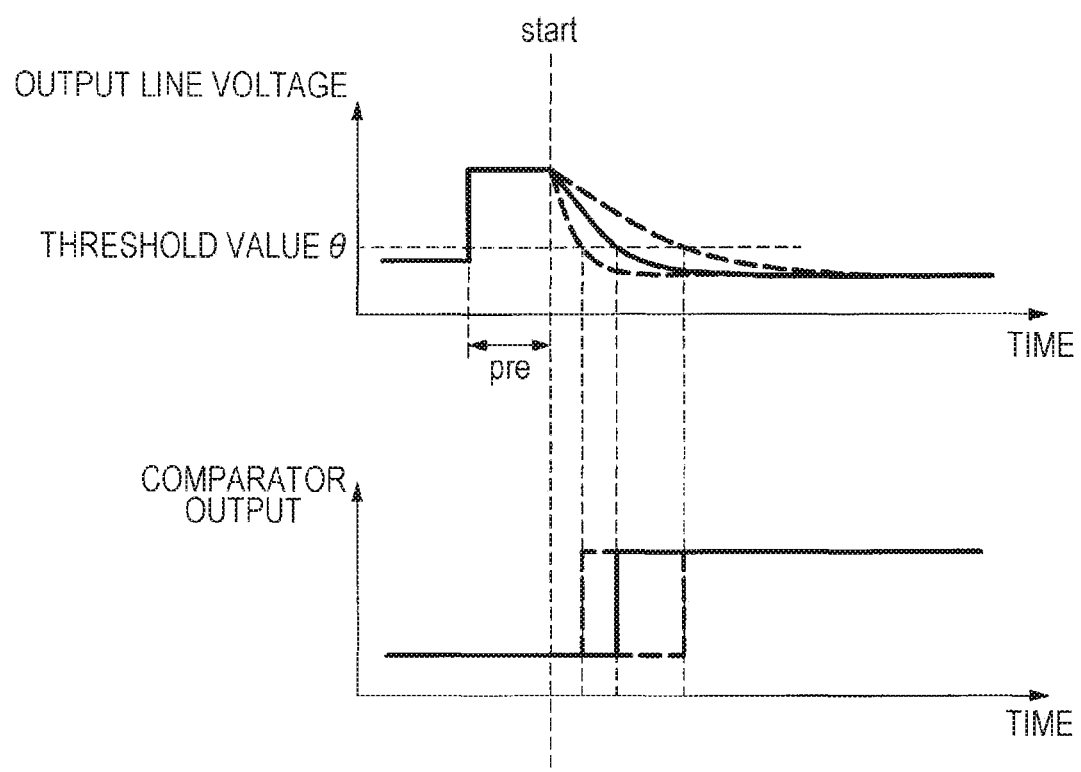
FIG. 2 is a graph showing an example of a potential change of an output line and a comparator in the product-sum calculation device according to the same embodiment.

Here, with reference to FIG. 2, control of the charge and discharge state of the output line Lout by the charge and discharge control unit 100 will be described more specifically. FIG. 2 is a graph showing an example of a potential change of an output line and a comparator in the product-sum calculation device 10 according to the present embodiment.

As shown in FIG. 2, the charge and discharge control unit 100 charges in advance (precharges) the output line Lout in a period (pre) before a product-sum calculation start (start) by the product-sum calculation device 10. Thereafter, when an input signal is input from the input line Lin to the variable resistance unit 200 that is a synapse, each of the output lines Lout discharges an electrical charge to the input line Lin connected to the source in accordance with a resistance value of the variable resistance unit 200 and a value of the input signal. Note that the value of the input signal may be expressed by a current, a voltage, a pulse width, or pulse delay time of the input signal, or a combination thereof.

At this time, a discharge speed of one output line Lout is determined by a combination of the input signal input to the variable resistance unit 200 connected to the output line Lout and a resistance value of the variable resistance unit 200. Therefore, the comparator connected to the output line Lout can output a signal in a case where a potential of the output line Lout becomes lower than a threshold value θ, to output a product-sum calculation result to a calculation circuit in a subsequent stage.

Note that, in the product-sum calculation device 10 described above, in a case where the output from the variable resistance unit 200 is represented as charge to the output line Lout without using the charge and discharge control unit 100, the output line Lout is electrically connected to the source of the three-terminal transistor included in the variable resistance unit 200. In such a case, a charge amount of the output line Lout increases due to the output of the product-sum calculation result, which increases a source potential of the three-terminal transistor included in the variable resistance unit 200. Therefore, a potential difference between the gate and the source of the three-terminal transistor is reduced, and a back bias effect occurs. This causes a current flowing from the three-terminal transistor to the output line Lout to be saturated or attenuated. In addition, an output capability of the current from the three-terminal transistor to the output line Lout varies depending on the potential of the output line Lout, which causes instability of the output to the output line Lout.

In the technology according to the present disclosure, in accordance with a polarity of the three-terminal transistor included in the variable resistance unit 200, control is performed as to whether to represent the output to the output line Lout as charge or discharge. Specifically, in the product-sum calculation device 10 according to the first embodiment of the present disclosure, first, the output line Lout is charged in advance (precharged), and then the output line Lout is discharged via the variable resistance unit 200 including the n-type three-terminal transistor. Therefore, since the source of the n-type three-terminal transistor included in the variable resistance unit 200 is fixed to the ground at a time of calculation, the product-sum calculation device 10 can be used without reducing a current output capability of the n-type three-terminal transistor.

Therefore, in the product-sum calculation device 10 according to the present embodiment, regardless of the potential of the output line Lout, it is possible to efficiently take out the output from the synapse to the output line Lout, and to stabilize the output to the output line Lout.

Figure 3:
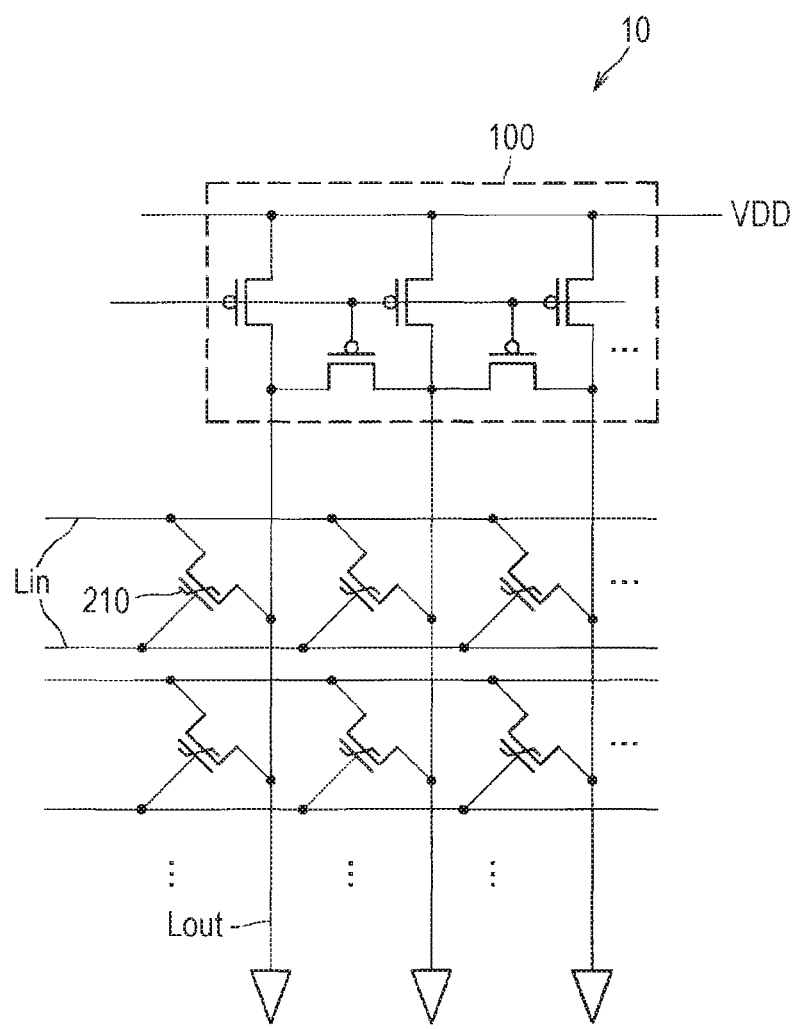
FIG. 3 is a circuit diagram showing an example of a specific configuration of the product-sum calculation device according to the same embodiment.
Figure 4:
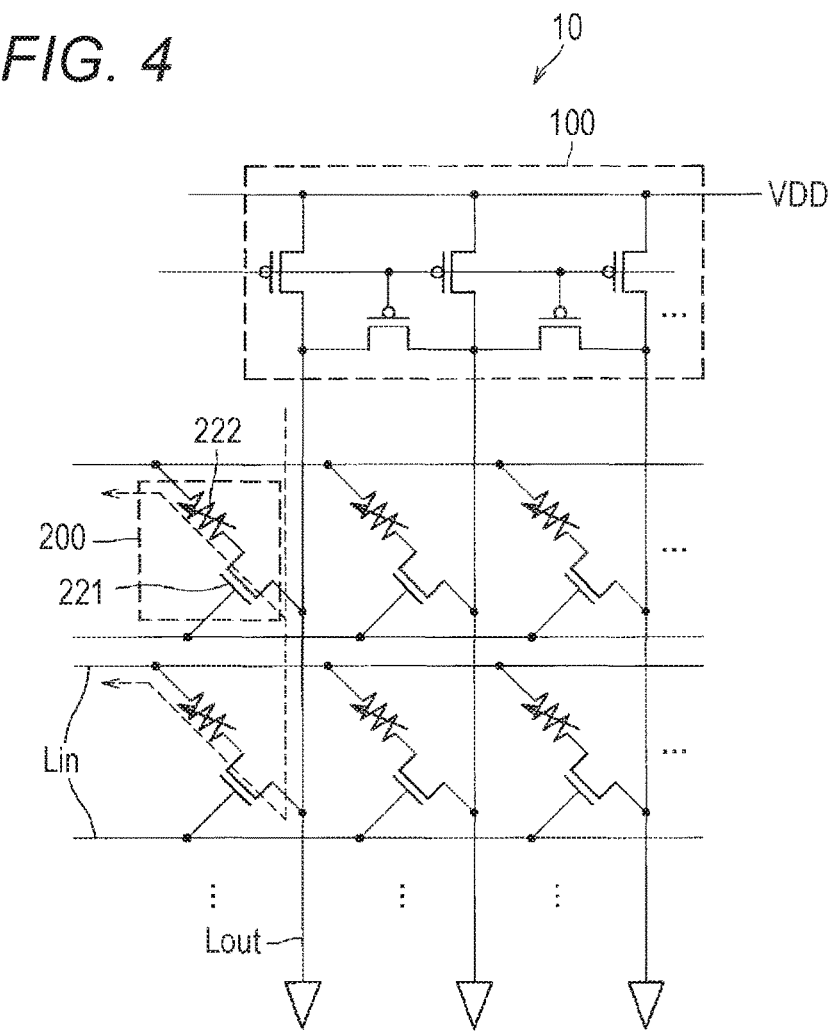
FIG. 4 is a circuit diagram showing an example of a specific configuration of the product-sum calculation device according to the same embodiment.

Next, with reference to FIGS. 3 and 4, a specific configuration example of the product-sum calculation device 10 according to the present embodiment will be described. FIGS. 3 and 4 are circuit diagrams showing an example of a specific configuration of the product-sum calculation device 10 according to the present embodiment.

As shown in FIG. 3, the charge and discharge control unit 100 may be formed by a p-type field effect transistor, and may supply power from the power supply potential VDD to each of the output lines Lout. Whereas, the variable resistance unit 200 may be formed by an n-type ferroelectric transistor 210. The ferroelectric transistor 210 is a non-volatile variable resistance element capable of changing a transistor output, by a threshold voltage changing in accordance with dielectric polarization of a ferroelectric material used for the gate insulating film. Note that, in place of the n-type ferroelectric transistor 210, the variable resistance unit 200 may be formed by an n-type floating-gate type transistor, an n-type spin transistor, or an n-type spin field effect transistor.

Alternatively, as shown in FIG. 4, the variable resistance unit 200 may be formed by connecting a two-terminal variable resistance element 222 and an n-type field effect transistor 221 in series. The two-terminal variable resistance element 222 may be any of a bipolar type or a unipolar type, and may be any of a voltage drive type or a current drive type. For example, the two-terminal variable resistance element 222 may be a magnetic tunnel junction element, a phase change memory element, a resistance change memory element, a ferroelectric tunnel junction element, a memory element using a nanotube, a nanomechanical memory element, or the like.

In the product-sum calculation device 10 shown in FIG. 4, the two-terminal variable resistance element 222 may be connected in series to the source side of the n-type field effect transistor 221. In such a case, since negative feedback due to a voltage drop of the two-terminal variable resistance element 222 is applied to the gate of the n-type field effect transistor 221, the product-sum calculation device 10 can greatly change a current drive capability of the entire synapse in accordance with a resistance value of the two-terminal variable resistance element 222.

Figure 5A:
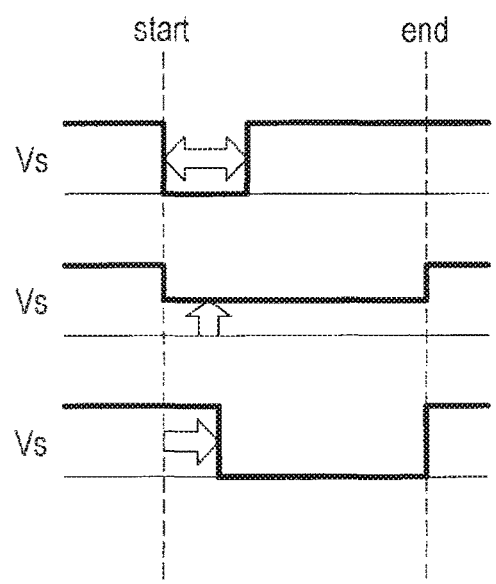
FIG. 5A is a waveform chart showing an example of an input signal in the product-sum calculation device according to the same embodiment.
Figure 5B:
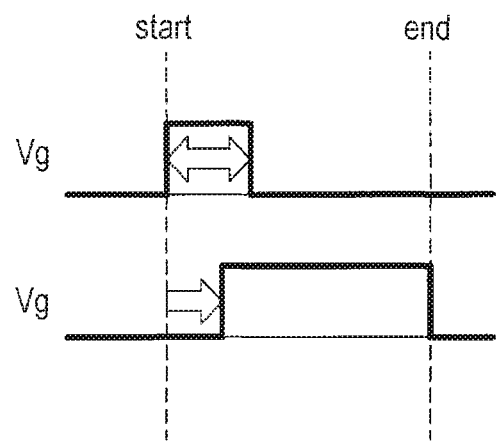
FIG. 5B is a waveform chart showing an example of an input signal in the product-sum calculation device according to the same embodiment.

Subsequently, with reference to FIGS. 5A and 5B, a specific example of an input signal in the product-sum calculation device 10 according to the present embodiment will be described. FIGS. 5A and 5B are waveform charts showing an example of an input signal in the product-sum calculation device 10 according to the present embodiment.

In the product-sum calculation device 10 according to the present embodiment, the input signal may be input to either the source or the gate of the three-terminal transistor included in the variable resistance unit 200.

In a case of inputting the input signal to the source of the three-terminal transistor included in the variable resistance unit 200, as shown in FIG. 5A, normally, after setting a source voltage Vs to a power supply potential, the input signal may be input as a negative voltage pulse to the source voltage Vs at a time of calculation. For example, the input signal may express input data with a pulse width, may express the input data as a difference from a power supply potential, may express the input data as a difference in an input timing from a reference time, and may express the input data as a combination thereof.

At this time, to the gate of the three-terminal transistor included in the variable resistance unit 200, a bias signal whose voltage value is the power supply potential and whose pulse width and timing are the same as those of the input signal may be applied. Furthermore, at a time of non-calculation, to the gate of the three-terminal transistor included in the variable resistance unit 200, a bias signal (for example, zero or a negative value) that causes the variable resistance unit 200 not to be energized may be applied.

In a case of inputting the input signal to the source of the three-terminal transistor included in the variable resistance unit 200, a voltage change can be used as the input signal. Therefore, a waveform of the input signal can be made more suitable for a circuit structure.

Whereas, in a case of inputting the input signal to the gate of the three-terminal transistor included in the variable resistance unit 200, as shown in FIG. 5B, an input signal representing input data as a pulse width or an input timing may be input to a gate voltage Vg at a time of calculation. At this time, a ground potential may be applied to the source of the three-terminal transistor included in the variable resistance unit 200 at a time of both the calculation and the non-calculation. Alternatively, to the source of the three-terminal transistor included in the variable resistance unit 200, the power supply potential may be applied at a time of non-calculation while the ground potential may be applied at a time of calculation.

In a case of inputting the input signal to the gate of the three-terminal transistor included in the variable resistance unit 200, the source is fixed at the ground potential. Therefore, the circuit structure of the product-sum calculation device 10 can be simplified, and the manufacturing cost of the product-sum calculation device 10 can be reduced.

2. Second Embodiment

Figure 6:
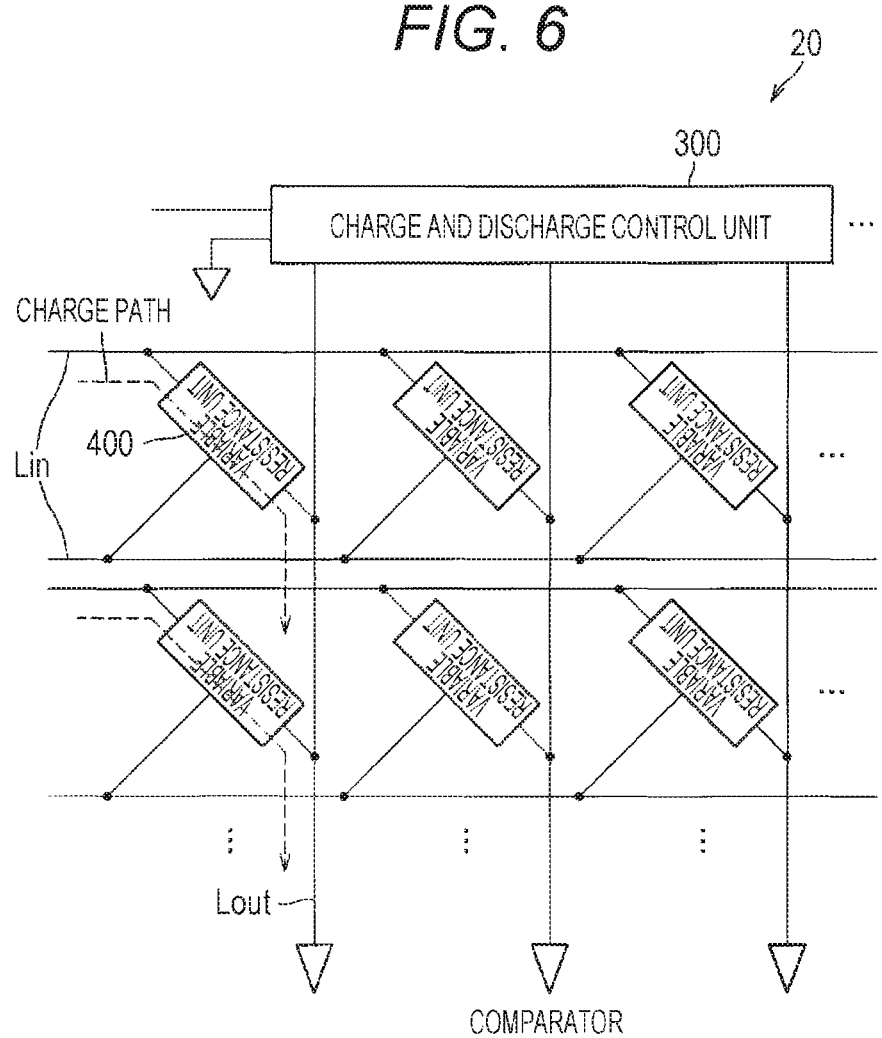
FIG. 6 is a circuit diagram schematically showing a circuit configuration of a product-sum calculation device according to a second embodiment of the present disclosure.

Next, with reference to FIGS. 6, 7, 8, 9, 10A, and 10B, a product-sum calculation device according to a second embodiment of the present disclosure will be described. FIG. 6 is a circuit diagram schematically showing a circuit configuration of the product-sum calculation device according to the second embodiment of the present disclosure.

As shown in FIG. 6, a product-sum calculation device 20 according to the present embodiment include: a plurality of input lines Lin extending in a first direction (for example, a row direction); a plurality of output lines Lout extending in a second direction (for example, a column direction) orthogonal to the first direction; a three-terminal variable resistance unit 400 provided at an intersection of the input line Lin and the output line Lout; and a charge and discharge control unit 300 configured to control charge and discharge of the output line Lout.

The variable resistance unit 400 is a circuit unit including a three-terminal transistor and being capable of changing a resistance value to two or more values. The variable resistance unit 400 functions as a synapse of the product-sum calculation device 20 by controlling the resistance value with the three-terminal transistor. The variable resistance unit 400 may be configured by a single three-terminal transistor, or may be configured by a plurality of elements including a three-terminal transistor.

The variable resistance unit 400 may be, for example, a non-volatile variable resistance element of a transistor type, such as a ferroelectric transistor, a floating-gate type transistor, a spin transistor, or a spin field effect transistor. Alternatively, the variable resistance unit 400 may be made by connecting a field effect transistor in series with a two-terminal non-volatile variable resistance element such as a magnetic tunnel junction element, a phase change memory element, a resistance change memory element, a ferroelectric tunnel junction element, a memory element using a nanotube, or a nanomechanical memory element.

In the product-sum calculation device 20 according to the second embodiment, a polarity of the three-terminal transistor included in the variable resistance unit 400 is p-type. The p-type three-terminal transistor is a transistor that uses positive holes as carriers that contribute to a current between a source and a drain. The p-type three-terminal transistor may be configured by, for example, providing an n-type region on a p-type semiconductor substrate, providing a gate electrode on the n-type region via a gate insulating film, and providing a p-type source region and a drain region on both sides of the gate electrode.

The input line Lin inputs an input signal to a synapse of the product-sum calculation device 20. Specifically, a plurality of input lines Lin is provided extending in the row direction, and is electrically connected to a gate or a source of the three-terminal transistor included in the variable resistance unit 400. Note that the input line Lin may input the input signal to the gate of the three-terminal transistor, or may input the input signal to the source of the three-terminal transistor.

The output line Lout outputs an output from the synapse of the product-sum calculation device 20 to a comparator or the like. Specifically, a plurality of output lines Lout is provided extending in the column direction orthogonal to the row direction that is the extending direction of the input line Lin, and outputs the output from the variable resistance unit 400 to the comparator or the like. For example, the output line Lout may be electrically connected to the drain of the three-terminal transistor included in the variable resistance unit 400.

The charge and discharge control unit 300 controls a charge and discharge state of the output line Lout. Specifically, the charge and discharge control unit 300 is electrically connected to the ground, and discharges the output line Lout in advance before product-sum calculation by the product-sum calculation device 20. Therefore, the charge and discharge control unit 300 can represent the output from the variable resistance unit 400 that is a synapse, as charge of the output line Lout.

Figure 7:
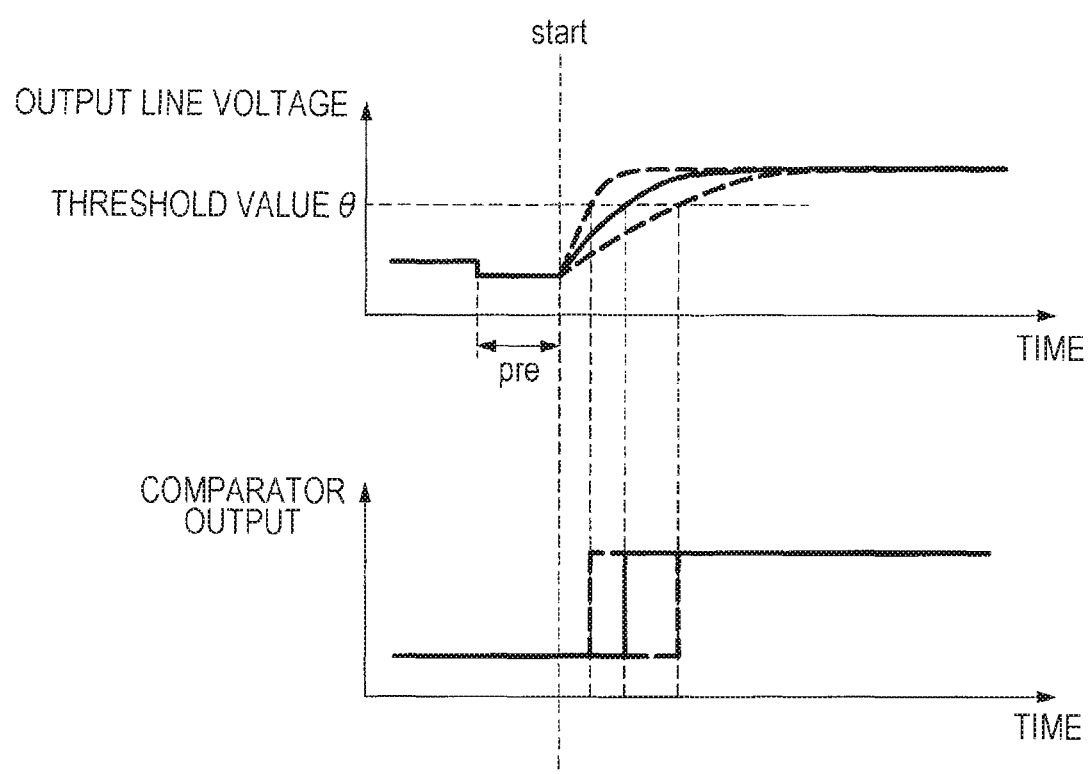
FIG. 7 is a graph showing an example of a potential change of an output line and a comparator in the product-sum calculation device according to the same embodiment.

Here, with reference to FIG. 7, control of the charge and discharge state of the output line Lout by the charge and discharge control unit 300 will be described more specifically. FIG. 7 is a graph showing an example of a potential change of an output line and a comparator in the product-sum calculation device 20 according to the present embodiment.

As shown in FIG. 7, the charge and discharge control unit 300 discharges in advance (predischarges) the output line Lout in a period (pre) before a product-sum calculation start (start) by the product-sum calculation device 20. Thereafter, when an input signal is input from the input line Lin to the variable resistance unit 400 that is a synapse, each of the output lines Lout charges, with an electrical charge, the output line Lout connected to the drain in accordance with a resistance value of the variable resistance unit 400 and a value of the input signal. Note that the value of the input signal may be expressed by a current, a voltage, a pulse width, or pulse delay time of the input signal, or a combination thereof.

At this time, a charge speed of one output line Lout is determined by a combination of the input signal input to the variable resistance unit 400 connected to the output line Lout and a resistance value of the variable resistance unit 400. Therefore, the comparator connected to the output line Lout can output a signal in a case where the potential of the output line Lout becomes higher than a threshold value θ, to output a product-sum calculation result to a calculation circuit in a subsequent stage.

In the technology according to the present disclosure, in accordance with a polarity of the three-terminal transistor included in the variable resistance unit 400, control is performed as to whether to represent the output to the output line Lout as charge or discharge. Specifically, in the product-sum calculation device 20 according to the second embodiment of the present disclosure, first, the output line Lout is discharged in advance (predischarged), and then the output line Lout is charged via the variable resistance unit 400 including the p-type three-terminal transistor. Therefore, since the output line Lout becomes the ground potential at a time of calculation, the product-sum calculation device 20 can efficiently take out the output from the synapse to the output line Lout.

Figure 8:
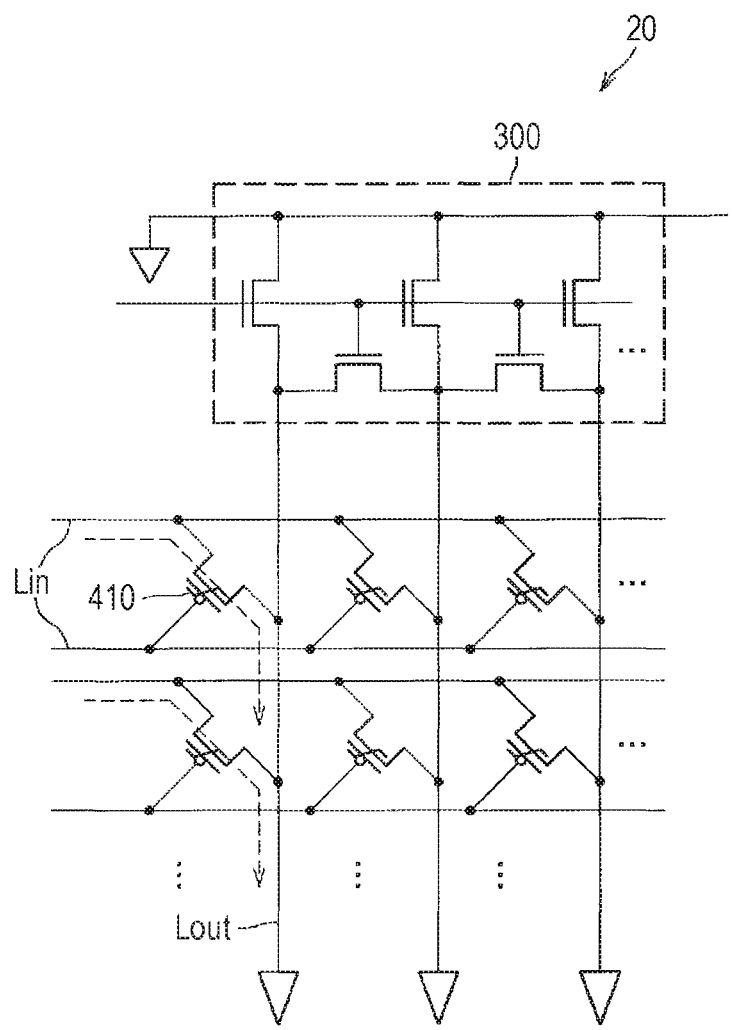
FIG. 8 is a circuit diagram showing an example of a specific configuration of the product-sum calculation device according to the same embodiment.
Figure 9:
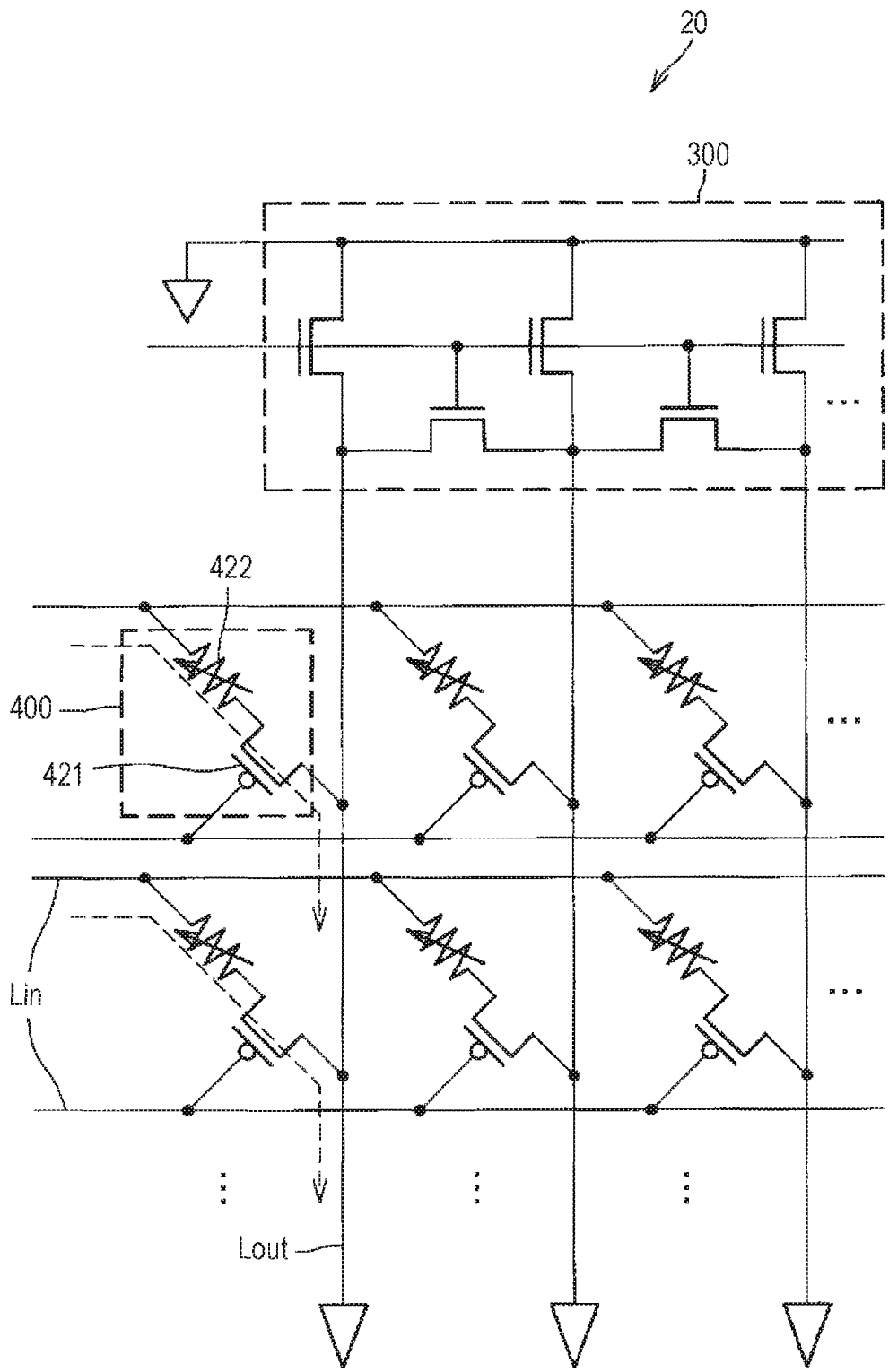
FIG. 9 is a circuit diagram showing an example of a specific configuration of the product-sum calculation device according to the same embodiment.

Next, with reference to FIGS. 8 and 9, a specific configuration example of the product-sum calculation device 20 according to the present embodiment will be described. FIGS. 8 and 9 are circuit diagrams showing an example of a specific configuration of the product-sum calculation device 20 according to the present embodiment.

As shown in FIG. 8, the charge and discharge control unit 300 is formed by an n-type field effect transistor, and can allow an electrical charge of the output line Lout to flow to the ground. Whereas, the variable resistance unit 400 may be formed by a p-type ferroelectric transistor 410. The ferroelectric transistor 410 is a non-volatile variable resistance element capable of changing a transistor output, by a threshold voltage changing in accordance with dielectric polarization of a ferroelectric material used for the gate insulating film. Note that, in place of the p-type ferroelectric transistor 410, the variable resistance unit 400 may be formed by a p-type floating-gate type transistor, a p-type spin transistor, or a p-type spin field effect transistor.

Alternatively, as shown in FIG. 9, the variable resistance unit 400 may be formed by connecting a two-terminal variable resistance element 422 and a p-type field effect transistor 421 in series. The two-terminal variable resistance element 422 may be any of a bipolar type or a unipolar type, and may be any of a voltage drive type or a current drive type. For example, the two-terminal variable resistance element 422 may be a magnetic tunnel junction element, a phase change memory element, a resistance change memory element, a ferroelectric tunnel junction element, a memory element using a nanotube, a nanomechanical memory element, or the like.

In the product-sum calculation device 20 shown in FIG. 9, the two-terminal variable resistance element 422 may be connected in series to the source side of the p-type field effect transistor 421. In such a case, since negative feedback due to a voltage drop of the two-terminal variable resistance element 422 is applied to the gate of the p-type field effect transistor 421, the product-sum calculation device 20 can greatly change a current drive capability of the entire synapse in accordance with a resistance value of the two-terminal variable resistance element 422.

Figure 10A:
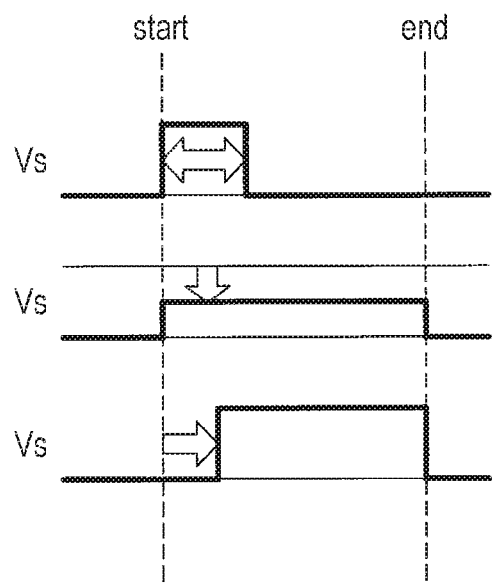
FIG. 10A is a waveform chart showing an example of an input signal in the product-sum calculation device according to the same embodiment.
Figure 10B:
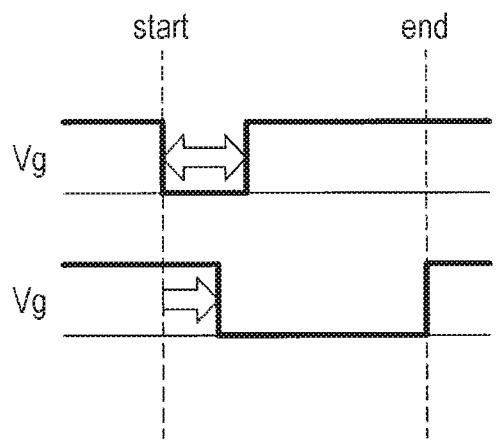
FIG. 10B is a waveform chart showing an example of an input signal in the product-sum calculation device according to the same embodiment.

Subsequently, with reference to FIGS. 10A and 10B, a specific example of an input signal in the product-sum calculation device 20 according to the present embodiment will be described. FIGS. 10A and 10B are waveform charts showing an example of an input signal in the product-sum calculation device 20 according to the present embodiment.

In the product-sum calculation device 20 according to the present embodiment, the input signal may be input to either the source or the gate of the three-terminal transistor included in the variable resistance unit 400.

In a case of inputting the input signal to the source of the three-terminal transistor included in the variable resistance unit 400, as shown in FIG. 10A, normally, after setting a source voltage Vs to a ground potential, the input signal may be input as a positive voltage pulse to the source voltage Vs at a time of calculation. For example, the input signal may express input data with a pulse width, may express the input data as a difference from the power supply potential or the ground potential, may express the input data as a difference in an input timing from a reference time, and may express the input data as a combination thereof.

At this time, to the gate of the three-terminal transistor included in the variable resistance unit 400, a bias signal whose voltage value is zero (or the ground potential) and whose pulse width and timing are the same as those of the input signal may be applied, and a bias signal whose voltage value is zero may be always applied. Furthermore, at a time of non-calculation, to the gate of the three-terminal transistor included in the variable resistance unit 400, a bias signal (for example, a signal having a voltage value equal to or higher than the power supply potential) that causes the variable resistance unit 400 not to be energized may be applied.

In a case of inputting the input signal to the source of the three-terminal transistor included in the variable resistance unit 400, a voltage change can be used as the input signal. Therefore, a waveform of the input signal can be made more suitable for a circuit structure.

Whereas, in a case of inputting the input signal to the gate of the three-terminal transistor included in the variable resistance unit 400, as shown in FIG. 10B, a negative input signal representing the input data as a pulse width or an input timing may be input to a gate voltage Vg at a time of calculation. At this time, a power supply potential may be applied to the source of the three-terminal transistor included in the variable resistance unit 400 at a time of both the calculation and the non-calculation. Alternatively, to the source of the three-terminal transistor included in the variable resistance unit 400, zero or the ground potential may be applied at a time of non-calculation while the power supply potential may be applied at a time of calculation.

In a case of inputting the input signal to the gate of the three-terminal transistor included in the variable resistance unit 400, the source is fixed at the ground potential. Therefore, the circuit structure of the product-sum calculation device 20 can be simplified, and the manufacturing cost of the product-sum calculation device 20 can be reduced.

3. Third Embodiment

Figure 11:
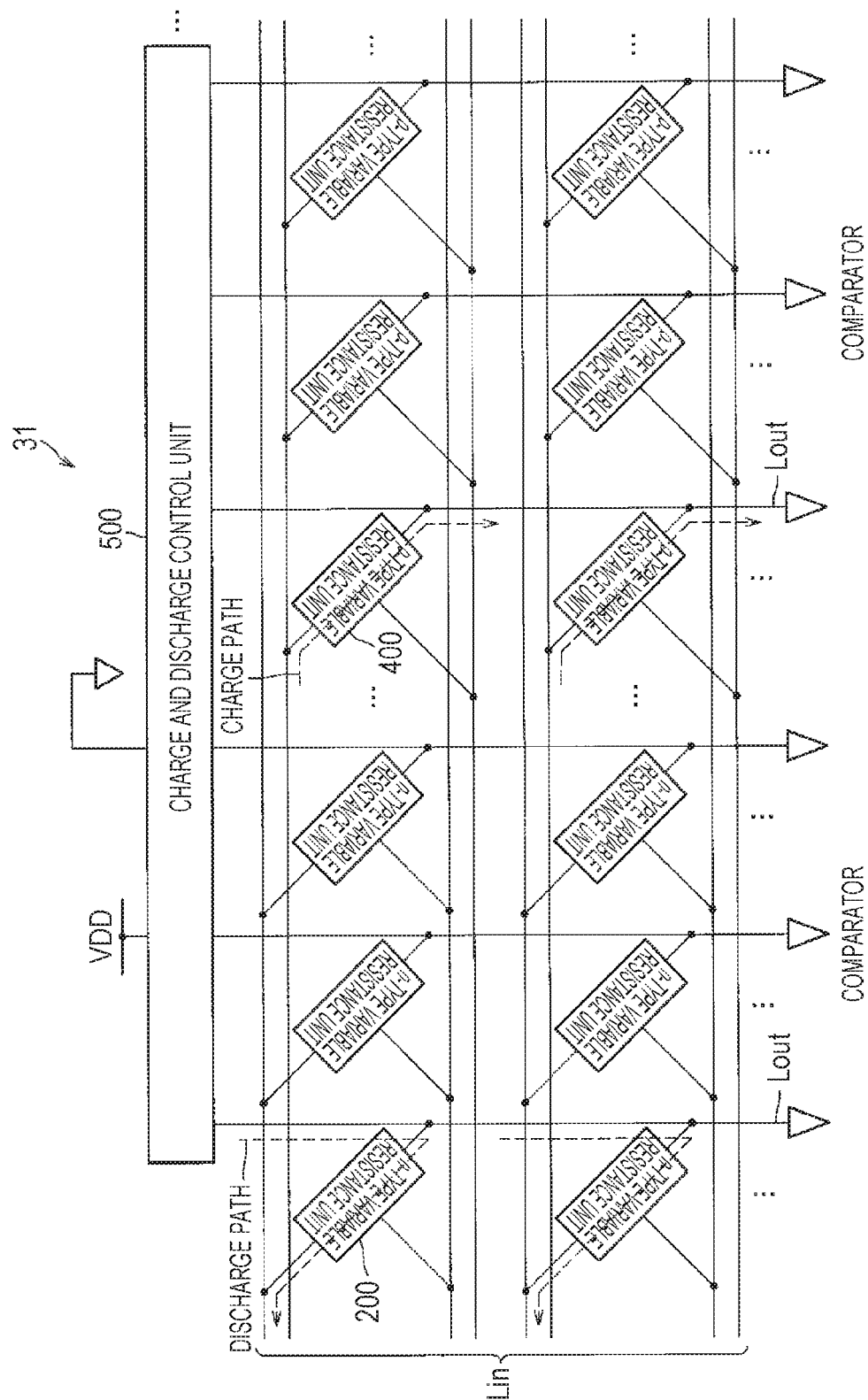
FIG. 11 is a circuit diagram schematically showing an example of a circuit configuration of a product-sum calculation device according to a third embodiment of the present disclosure.
Figure 12:
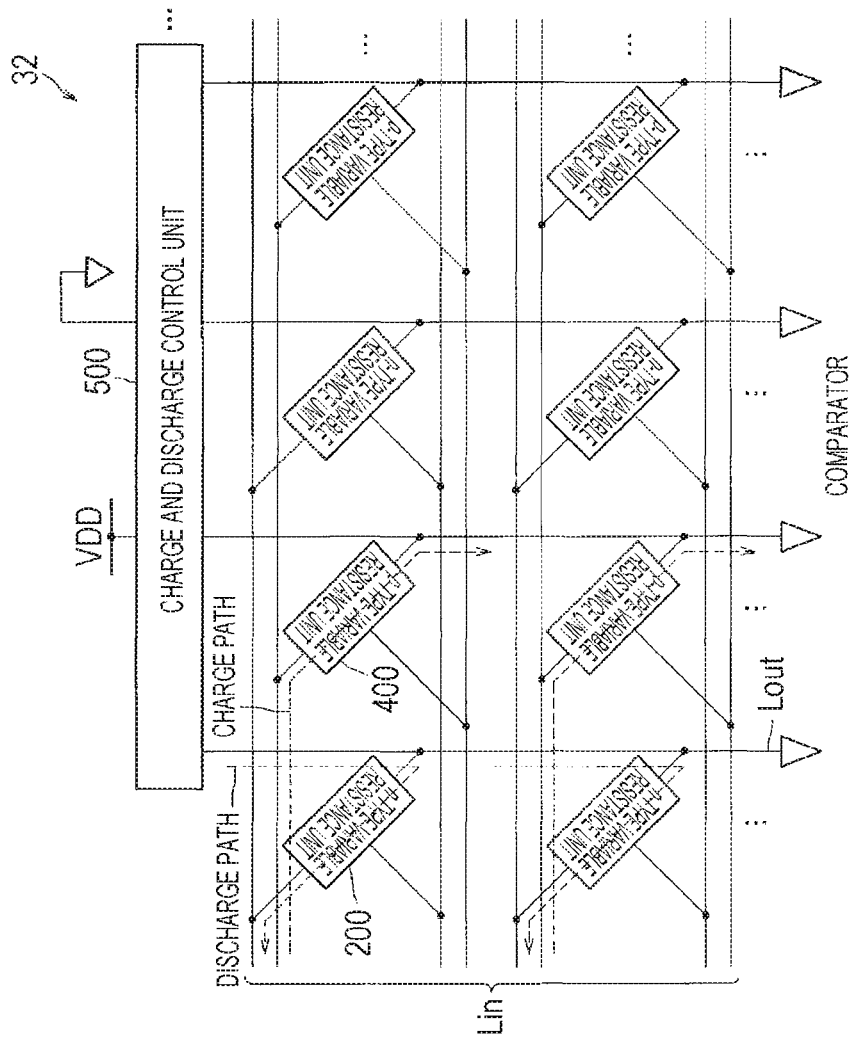
FIG. 12 is a circuit diagram schematically showing an example of a circuit configuration of the product-sum calculation device according to the third embodiment of the present disclosure.

Next, with reference to FIGS. 11 and 12, a product-sum calculation device according to a third embodiment of the present disclosure will be described. FIGS. 11 and 12 are circuit diagrams schematically showing an example of a circuit configuration of the product-sum calculation device according to the third embodiment of the present disclosure.

As shown in FIGS. 11 and 12, product-sum calculation devices 31 and 32 according to the present embodiment include, for example: a plurality of input lines Lin extending in a first direction (for example, a row direction); a plurality of output lines Lout extending in a second direction (for example, a column direction) orthogonal to the first direction; three-terminal variable resistance units 200 and 400 provided at an intersection of the input line Lin and the output line Lout; and a charge and discharge control unit 500 configured to control charge and discharge of the output line Lout. Note that, since these configurations are substantially the same as the configurations of the same reference numerals described in the first and second embodiments, detailed description thereof will be omitted here.

The product-sum calculation devices 31 and 32 according to the present embodiment include both the variable resistance unit 200 including an n-type three-terminal transistor and the variable resistance unit 400 including a p-type three-terminal transistor.

In the product-sum calculation device 31 shown in FIG. 11, the variable resistance unit 200 including the n-type three-terminal transistor and the variable resistance unit 400 including the p-type three-terminal transistor are individually arranged in different regions. Whereas, in the product-sum calculation device 32 shown in FIG. 12, the variable resistance unit 200 including the n-type three-terminal transistor and the variable resistance unit 400 including the p-type three-terminal transistor are alternately arranged in every column.

At this time, the charge and discharge control unit 500 individually controls the charge and discharge control unit 100 according to the first embodiment described above and the charge and discharge control unit 300 according to the second embodiment described above, in accordance with polarities of the three-terminal transistors included in the variable resistance unit 200 and the variable resistance unit 400 each.

Specifically, the charge and discharge control unit 500 charges or discharges in advance (precharges or predischarges) each output line Lout in accordance with the polarities of the three-terminal transistors of the variable resistance units 200 and 400 connected to the respective output lines Lout. Thereafter, an input signal is input from the input line Lin to each of the variable resistance units 200 and 400. The input signal may be input to either the source or the gate of the three-terminal transistor of the variable resistance units 200 and 400.

Furthermore, in the product-sum calculation devices 31 and 32, waveforms of the input signals input by the variable resistance unit 200 having the n-type three-terminal transistor and the variable resistance unit 400 having the p-type three-terminal transistor may be complementary. In such a case, for example, the input line Lin may be provided so as to form an input line pair to which complementary data is input. Alternatively, a buffer circuit for generation of a complementary input signal may be provided in a preceding stage of the input line Lin.

In the product-sum calculation devices 31 and 32 according to the third embodiment, a synapse (the variable resistance unit 200) that expresses an output signal by discharge can coexist with a synapse (the variable resistance unit 400) that expresses an output signal by charge. Therefore, in the product-sum calculation devices 31 and 32 according to the third embodiment, it is possible to form a neural network that reproduces, with high fidelity, a neuronal network of a living body in which both excitatory and inhibitory synapses exist. That is, the product-sum calculation devices 31 and 32 according to the third embodiment can implement a more complex neural network that compares or combines positive and negative decisions to determine an output.

The preferred embodiments of the present disclosure have been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Note that the following configurations are also within the technical scope of the present disclosure.

(1)
A product-sum calculation device including:
a plurality of synapses including a transistor and having a variable resistance value;
a plurality of input lines extending in a first direction and configured to propagate an input signal to each of the plurality of synapses;
a plurality of output lines extending in a second direction orthogonal to the first direction, and configured to output a product-sum calculation result of the input signal from each of the plurality of synapses; and
a charge and discharge control unit configured to control an output state of the product-sum calculation result by controlling a charge and discharge state of each of the output lines on the basis of a polarity of the transistor.

(2)
The product-sum calculation device according to (1) described above, in which the product-sum calculation result is output in accordance with a value of the input signal and a resistance value of each of the synapses input with the input signal.

(3)
The product-sum calculation device according to (1) or (2) described above, in which the charge and discharge control unit controls whether to output the product-sum calculation result as charge or discharge of each of the output lines, on the basis of whether the transistor is n-type or p-type.

(4)
The product-sum calculation device according to (3) described above, in which, in a case where the transistor is n-type, the charge and discharge control unit causes each of the output lines to output the product-sum calculation result, by controlling to discharge from each of the output lines in a charged state.

(5)
The product-sum calculation device according to (3) described above, in which, in a case where the transistor is p-type, the charge and discharge control unit causes each of the output lines to output the product-sum calculation result, by controlling to charge each of the output lines in a discharge state.

(6)
The product-sum calculation device according to any one of (3) to (5) described above, in which the plurality of synapses includes a synapse including an n-type transistor and a synapse including a p-type transistor.

(7)
The product-sum calculation device according to (6), in which the plurality of synapses electrically connected to the same one of the output lines includes the transistor having the same polarity.

(8)
The product-sum calculation device according to any one of (1) to (7) described above, in which the plurality of synapses has a resistance value of two or more values.

(9)
The product-sum calculation device according to any one of (1) to (8) described above, in which the transistor is a transistor whose channel resistance value is variable.

(10)
The product-sum calculation device according to any one of (1) to (8) described above, in which each of the synapses further includes a two-terminal variable resistance element connected in series to a source side of the transistor.

(11)
The product-sum calculation device according to any one of (1) to (10) described above, in which each of the input lines is electrically connected to any of a gate of the transistor, or a source or a drain of the transistor.

(12)
The product-sum calculation device according to any one of (1) to (11) described above, in which the input signal is represented by at least one or more of magnitude of a voltage or a current, a pulse width, or an input timing.

(13)

The product-sum calculation device according to any one of (1) to (12) described above, in which the plurality of synapses is arranged in a matrix.

(14)

A product-sum calculation method including:
charging or discharging an output line of a plurality of synapses including a transistor and having a variable resistance value, on the basis of a polarity of the transistor; and
causing a product-sum calculation result to be output by controlling to discharge from the charged output line, or by controlling to charge the discharged output line on the basis of the product-sum calculation result of an input signal input to the plurality of synapses.

REFERENCE SIGNS LIST 10, 20, 31, 32 Product-sum calculation device
100, 300 Charge and discharge control unit
200, 400 Variable resistance unit
210, 410 Ferroelectric transistor
221, 421 Field effect transistor
222, 422 Variable resistance element
500 Charge and discharge control unit

The invention claimed is:

1. A product-sum calculation device, comprising:
a plurality of synapses including a transistor, wherein each of the plurality of synapses has a variable resistance value;
a plurality of input lines that extends in a first direction, wherein the plurality of input lines is configured to propagate an input signal to each of the plurality of synapses;
a plurality of output lines that extends in a second direction orthogonal to the first direction, wherein the plurality of output lines is configured to output a product-sum calculation result of the input signal from each of the plurality of synapses; and
a charge and discharge control unit configured to:
one of precharge or predischarge, prior to input of the input signal from the plurality of input lines, each of the plurality of output lines based on a polarity of the transistor, wherein each of the plurality of output lines is electrically connected to a drain of the transistor;
control a charge and discharge state of each of the plurality of output lines based on the polarity of the transistor; and
control, based on the input signal and the controlled charge and discharge state, an output state of the product-sum calculation result.

2. The product-sum calculation device according to claim 1, wherein the product-sum calculation result is output based on a value of the input signal and a resistance value of each of the plurality of synapses input with the input signal.

3. The product-sum calculation device according to claim 1, wherein the charge and discharge control unit is further configured to control, based on the transistor being one of an n-type or a p-type, whether to output the product-sum calculation result as charge or discharge of each of the plurality of output lines.

4. The product-sum calculation device according to claim 3, wherein, based on the transistor is the n-type, the charge and discharge control unit is further configured to:
control a discharge of each of the plurality of output lines in a charged state, and
control each of the plurality of output lines to output the product-sum calculation result based on the controlled discharge of each of the plurality of output lines.

5. The product-sum calculation device according to claim 3, wherein, based on the transistor is the p-type, the charge and discharge control unit is further configured to:
control a charge of each of the plurality of output lines in a discharge state, and
control each of the plurality of output lines to output the product-sum calculation result based on the controlled charge of each of the plurality of output lines.

6. The product-sum calculation device according to claim 3, wherein the plurality of synapses includes:
a synapse including an n-type transistor, and
a synapse including a p-type transistor.

7. The product-sum calculation device according to claim 6, wherein a set of synapses of the plurality of synapses electrically connected to a same output line of the plurality of output lines includes the transistor that has a same polarity.

8. The product-sum calculation device according to claim 1, wherein the plurality of synapses has a resistance value of at least two values.

9. The product-sum calculation device according to claim 1, wherein a channel resistance value of the transistor is variable.

10. The product-sum calculation device according to claim 1, wherein each of the plurality of synapses further includes a two-terminal variable resistance element connected in series to a source side of the transistor.

11. The product-sum calculation device according to claim 1, wherein each of the plurality of input lines is electrically connected to one of a gate of the transistor or a source of the transistor.

12. The product-sum calculation device according to claim 1, wherein the input signal is represented by at least one of a magnitude of a voltage, a magnitude of a current, a pulse width, or an input timing.

13. The product-sum calculation device according to claim 1, wherein the plurality of synapses is in a matrix.

14. A product-sum calculation method, comprising:
charging or discharging, based on a polarity of a transistor, an output line of a plurality of synapses including the transistor, wherein each of the plurality of the synapses has a variable resistance value;
controlling a plurality of output lines to output_a product-sum calculation result, wherein the plurality of output lines includes the output line;
one of precharging or predischarging, prior to input of an input signal from a plurality of input lines, each of the plurality of output lines based on the polarity of the transistor, wherein each of the plurality of output lines is electrically connected to a drain of the transistor;
controlling discharge or charge of the charged or discharged output line based on the product-sum calculation result of the input signal input to the plurality of synapses; and
controlling, based on the input signal and the controlled charge or discharge, an output state of the product-sum calculation result.

* * * * *